United States Patent
Krieger

(10) Patent No.: US 6,531,966 B2
(45) Date of Patent: Mar. 11, 2003

(54) LASER PARKING GUIDE

(75) Inventor: Michael Krieger, Miami, FL (US)

(73) Assignee: Vector Products, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/852,138

(22) Filed: May 10, 2001

(65) Prior Publication Data

US 2002/0011938 A1 Jan. 31, 2002

Related U.S. Application Data

(60) Provisional application No. 60/202,880, filed on May 10, 2000.

(51) Int. Cl.$^7$ ................................................ G08G 1/14
(52) U.S. Cl. ..................... 340/932.2; 340/933; 340/988
(58) Field of Search ................................ 340/932.2, 933, 340/935, 938, 988, 556, 557, 934, 518

(56) References Cited

U.S. PATENT DOCUMENTS 4,665,378 A * 5/1987 Heckethorn ............... 250/491.1
5,285,205 A * 2/1994 White ........................... 33/264
5,623,259 A * 4/1997 Giangardella ................ 340/435
5,841,368 A * 11/1998 Bryant ....................... 340/932.2
6,002,346 A * 12/1999 Bowden et al. ............. 180/168
6,154,150 A * 11/2000 Lubach ................... 340/309.15
6,184,800 B1 * 2/2001 Lewis .......................... 116/202

* cited by examiner

Primary Examiner—Daniel J. Wu
Assistant Examiner—Son Tang
(74) Attorney, Agent, or Firm—Robert Kinberg; Jung (John) Kim; Venable

(57) ABSTRACT

A method and apparatus for guiding a vehicle into a parking location comprising: a base configured to be mounted above the desired parking position; an IR motion sensor with a field of view for detecting motion of vehicle entering the field of view; and a visible alignment laser, wherein the laser is activated for a predetermined time by the IR sensor, the IR motion sensor and the alignment laser are connected to said base, and the laser is adjustably directed essentially perpendicular to the parking location.

10 Claims, 3 Drawing Sheets

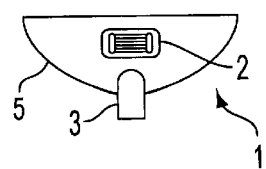
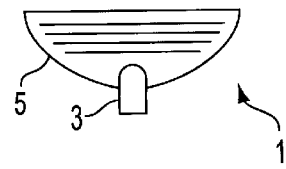
FIG. 1A
FIG. 1B
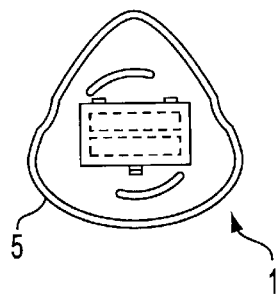
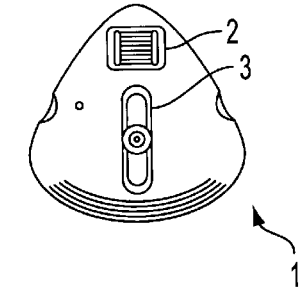
FIG. 1C
FIG. 1D
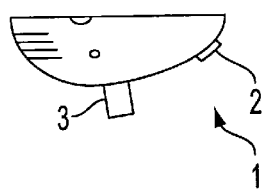
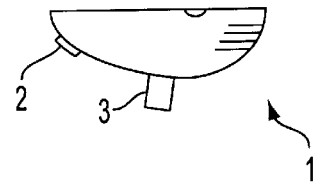
FIG. 1E
FIG. 1F
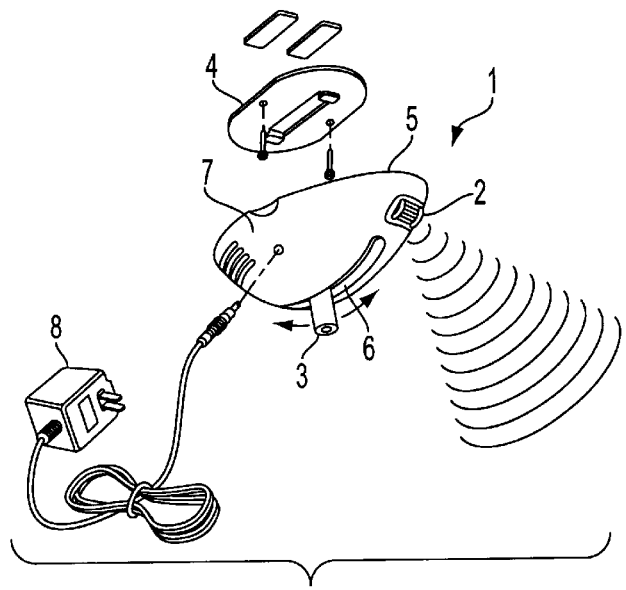
FIG. 1G

LASER PARKING GUIDE

CROSS-REFERENCE TO RELATED APPLICATION

This application claims the priority of Provisional Application No. 60/202,880 filed May 10, 2000, the subject matter of which is incorporated herein by reference.

BACKGROUND OF THE INVENTION

1. Field of the Invention

The invention relates to a method and a device for guiding a vehicle into a parking location. More particularly, the present invention relates to an apparatus which utilizes a laser beam, which serves as an alignment guide for positioning the vehicle in the parking area.

2. Background of the Invention

The prior art includes a number of arrangements for monitoring a vehicle's position using light beams, infrared beams, ultrasonic beams, microwave beams, etc., coupled with a variety of signaling means. The following patents, which are each incorporated herein by reference, disclose such arrangements:

U.S. Pat. No. 4,665,378 discloses a system for improving garage safety which requires an electric motor-operated garage door operator and a light source to direct the position of the car electronically connected to the electric motor-operated garage door operator.

U.S. Pat. No. 4,665,378 discloses vehicle garaging methods and apparatus including a concentrated light beam which illuminates a spot on the floor when no vehicle is present and illuminates a spot on the dashboard (for example) when the vehicle is properly parked.

U.S. Pat. No. 4,808,997 discloses a vehicle positioning device comprising a sensor to receive upwardly reflected light and amplifier means for the sensor.

U.S. Pat. No. 4,808,997 shows an arrangement including a photoelectric device for signaling the position of a vehicle. A photoelectric beam is either reflected by a vehicle intercepting the beam or interrupts a beam reflected back to the transmitter by a mirror to signal the presence of the vehicle in the beam path.

U.S. Pat. No. 4,965,571 discloses a vehicle parking guide system with a lever requiring physical contact with a vehicle.

U.S. Pat. No. 5,177,479 discloses a garage parking position indicator based on a sensor for detecting the vehicle's position using transmitters and sensors located at the entrance door to the garage.

U.S. Pat. No. 5,208,586 discloses an arrangement for signaling when a vehicle has reached a predetermined position in a garage using an ultrasonic pulse generator and receiver and complex control circuitry.

U.S. Pat. No. 5,231,392 discloses a portable vehicle parking assistance device comprising a sensor resting on the floor which, essentially, the car bumps into.

U.S. Pat. No. 5,285,205 discloses a guidance system for controlling the lateral position of a vehicle in a confined space. The device comprises a visible laser beam directed at an angle close to parallel to the parking surface and a target on the windshield of the vehicle, such that beam is incident on the target while the vehicle is being positioned.

U.S. Pat. No. 5,587,938 discloses a vehicle parking guide system based on the generation of a local map to guide parking maneuvers.

U.S. Pat. No. 5,589,747 discloses a parking guide device based on an electrically powered garage door opener, a sensor module using infrared light, a timing circuit, and a conduit connected to the garage door system for control lines.

U.S. Pat. No. 5,617,087 discloses a vehicle parking guide based on a switch with which the vehicle makes physical contact.

U.S. Pat. No. 5,623,259 disclose an IR motion detector based system for sensing and reporting the position of a vehicle in a confined space by responding to changes in temperature and motion. An IR sensor detects the presence of a vehicle at a predetermined end position and signals the vehicle driver accordingly.

U.S. Pat. No. 5,646,619 discloses a vehicle parking guide based on a video camera built into the vehicle.

U.S. Pat. No. 5,689,236 discloses a garage door position indicator based on a combination that includes an automatic garage door opener with a sensor attached to the garage door.

U.S. Pat. No. 5,841,269 is based on a vehicle parking system comprising a sensor responsive to pressure due to the tires of a parking vehicle.

U.S. Pat. No. 5,945,907 discloses a vehicle parking system which comprises an ultrasonic detection to detect the proximity of a vehicle.

U.S. Pat. No. 6,002,346 discloses a vehicle parking system in conjunction with a garage having a garage door opener. The device relies upon a sensor for sensing operation of the garage door opener, a laser that is activated when the sensor is triggered, and a mirror adjustment mechanism to modify the direction of the light beam to a predetermined location in the garage.

In general, most of these arrangements involve relatively high cost or complex positioning strategies. They are not easily translated to home use and/or multicar garages. The prior art devices intended for home use are typically less sophisticated and less reliable. None of the prior art arrangements sufficiently combine the precision of the more sophisticated arrangements with the low cost and versatility of the less sophisticated arrangements. None of the prior art arrangements sufficiently provide these features in an integrated, single unit for the detection and signaling.

SUMMARY OF THE INVENTION

An object of the invention is to provide a method and a device for guiding a vehicle into a parking location A further object of the invention is to combine the precision of the sophisticated parking guide arrangements with the low cost and versatility of the less sophisticated arrangements.

A further object of the invention is to provide these features in an integrated, single unit for the detection and signaling.

The invention includes a method, an apparatus, and an article of manufacture for guiding a vehicle into a parking location. More particularly, the present invention relates to an apparatus which utilizes an infrared (IR) motion detection system arranged to detect a vehicle entering a parking area and to activate a substantially vertically aligned laser beam, which serves as an alignment guide for positioning the vehicle in the parking area.

According to the present invention, there is provide a parking guide for a guiding a vehicle into a parking location, comprising: a base configured to be mounted above a desired parking position; an IR motion sensor with a field of view for detecting motion of vehicle entering the field of view; and an alignment laser having a visible output, wherein the laser is activated for a predetermined time by the IR sensor, the IR motion sensor and the alignment laser are connected to the base, and the laser output is adjustable to be incident on a designated target location on the vehicle when the vehicle is parked in the desired parking position. Preferably, the laser directed essentially perpendicular to the parking location, for example, essentially perpendicular to a location on the floor of a parking garage. Preferably, the base includes a housing to house the laser and IR sensor. This housing is preferably removably attachable to the base.

The parking guide preferably comprises a timing circuit connected to the alignment laser for activating the alignment laser for the predetermined time. The circuit is responsive to the IR sensor and, accordingly, to motion in the field of view. The timing circuit can be set to keep the laser activated for any period of time, such as between 45 and 90 seconds. The timing circuit may also be designed such that the time period is reset with each additional motion detected by the IR sensor. The parking guide may secure its electrical power from a battery or a DC input coupled to an AC to DC adapter.

The laser output is adjustable so that it can be aligned to be incident on a selectable location of the vehicle when the vehicle reaches a predetermined parking position. For this and other reasons, the direction and positioning of the laser is preferably adjustable. The direction of the IR sensor and its field of view may also be adjustable.

The above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIGS. 1A–G illustrate, respectively, front, back, bottom, top, left, right and exploded perspective views of a preferred embodiment of the current invention.

DETAILED DESCRIPTION OF THE PREFERRED EMBODIMENTS

Figure 2A:
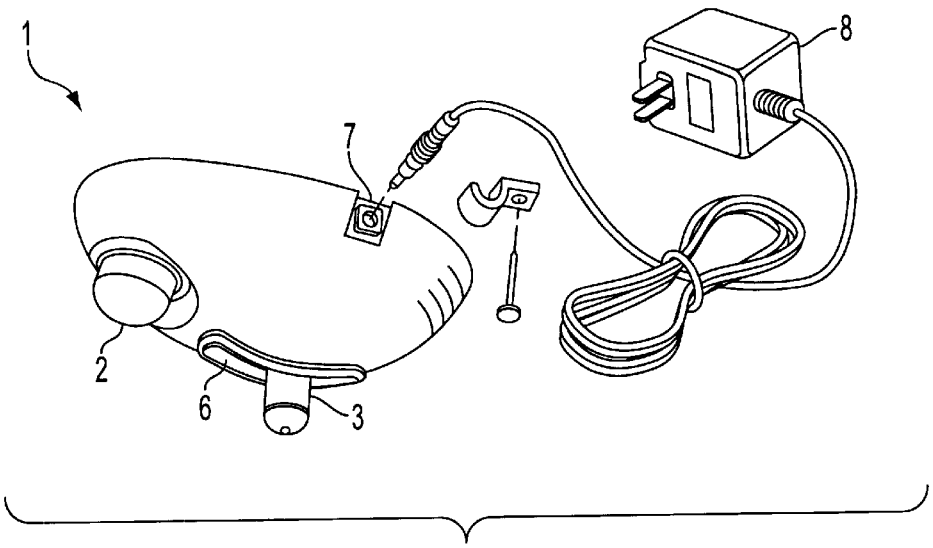
FIGS. 2A–C illustrates left, right, and bottom (3-D) perspective views of a preferred embodiment of the current invention.

As shown in FIGS. 1A–G, a preferred embodiment the parking guide 1 comprises an IR sensor 2 with a field of view for detecting motion of a vehicle entering the field of view, a visible alignment laser 3 adjustable in an adjustment region 6, a base 4 for mounting above the desired parking position, a housing 5 to house the laser 3 and IR sensor 2, a DC input 7, and a AC/DC converter 8 for supplying current.

Figure 2B:
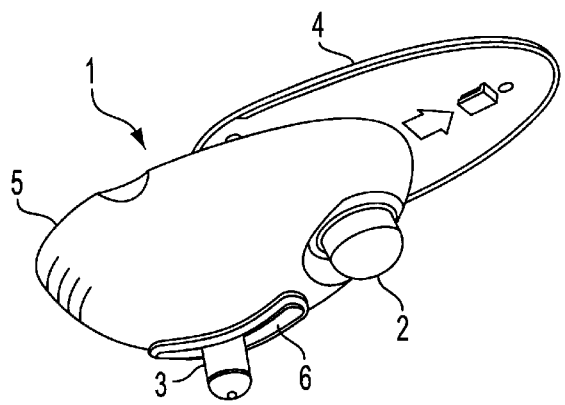
Figure 2C:
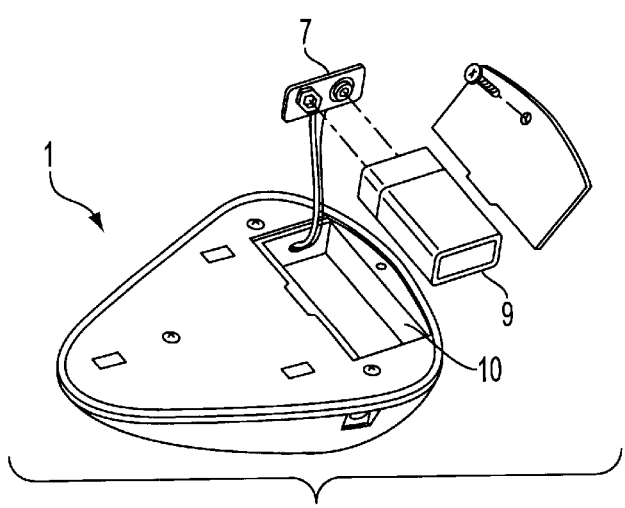
Figure 3:
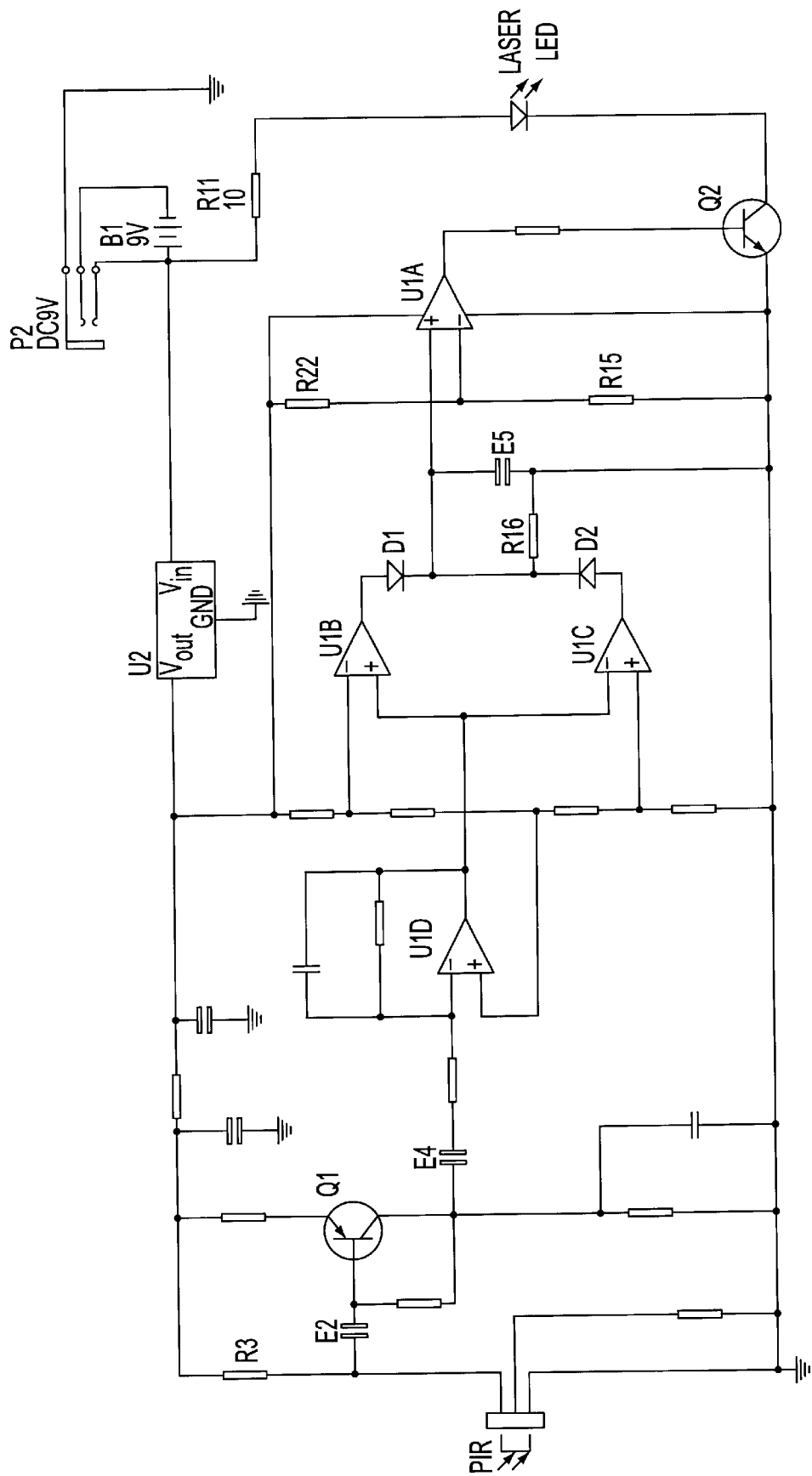
FIG. 3 is a circuit schematic of a preferred embodiment for an electrical circuit for implementing the invention.

As shown in FIGS. 2A–C, a preferred embodiment the parking guide 1 comprises an IR sensor 2 with a field of view for detecting motion of vehicle entering the field of view, a visible alignment laser 3 adjustable in an adjustment region 6, a base 4 for mounting above the desired parking position, a housing 5 to house the laser 3 and IR sensor 2, a DC input 7 compatible with an AC/DC converter 8. Base 4 includes a batter compartment 10 for receiving a standard batter, e.g. a 9V batter from which the electrical circuit of the device (see FIG. 3) can alternatively receive its power.

The laser is typically positioned such that when the vehicle reaches the predetermined parking position, the laser output will be incident on a designated target location on the vehicle.

The designated target location may be anywhere on the vehicle, including on the hood, the windshield, or the dashboard. The positioning of the alignment laser may be accomplished while the vehicle is in a parked position by aligning the output of the laser to be incident on the vehicle at the designated target location. The laser may also be preposition and the designated target location may be determined by parking the vehicle in the predetermined position, noting the vehicle location on which the laser output is incident, and denoting this location as the designated target location.

As shown in the circuit schematic (FIG. 3), a preferred embodiment of the parking guide comprises an infrared sensing device that changes resistance when there is a temperature change in the field of view and a LED laser that emits a beam of visible laser light. As shown in this circuit, following the power source there is a current limiting resistor (R11) that prevents overdriving the LED laser. This resistor is used is for two reasons. First, as a current limiter it prevents the LED from being overdriven because of output power fluctuations or problems. Second, the resistor helps ensure a long life for the laser diode.

The power source may be, for example, a standard 9 Volt battery B1, or an AC/DC converter with a barrel connector. The converter's barrel connector plugs into a receptacle P2 that contains a switch that disconnects the battery, thus permitting the converter to power the circuit if the converter is powered by AC. Current in the circuitry is 3 mA quiescent; 42 mA active (with the LED laser lit). The active current is based on the inclusion of an optional LED that indicates when the unit is powering the laser.

In the circuit, transistor Q2 acts like an on/off switch that merely turns the LED laser on or off depending whether the transistor is conducting or not conducting. U2 is a three-terminal voltage regulator that ensures that all timing critical and sensitivity critical components have a constant voltage source regardless of variations in battery voltage or AC line voltage. This constant voltage powers the quad dual input operational amplifier package (U1A–U1D) as well as Q1, the input transistor amplifier.

In response to a change of temperature, the resistance of the IR sensor (PIR) changes. Resistor R3 provides the IR detector with a stable voltage. Capacitor E2 couples the change in voltage to transistor Q1, which acts as a buffer amplifier. The output of transistor (Q1) is coupled to the inverting high gain operational amplifier U1D input by means of another capacitor E4. Amplifier U1D has a gain of 1,000,000. The noninverting input of the operational amplifier is fixed to exactly one half the regulated supply voltage, so any change in voltage from the output of Q1 is greatly amplified. Amplifiers U1B and U1C and associated resistors symmetrically compare the output of U1D to fixed offset voltages. As U1B and U1C have no feedback to limit gain, the outputs of U1B and U1C swing to saturation (e.g. either ground or regulated DC voltage). The symmetrical comparison and diodes D1 and D2 form a clipping circuit that essentially changes the analog (proportional) output from U1D to a uniform level change. The polarity of the diodes D1 and D2 along with RC timing circuit formed by E5 and R16, provide an asymmetrical charge/discharge path for the RC circuit formed by R16 and E5 and provide a delay, preferably in the range of 45–90 seconds, in the time-out mode, and a millisecond delay in the time on mode. The output of the RC timing circuit is compared in U1A with a reference voltage obtained from a tap off of a voltage divider formed by R22 and R15, which turns Q2 on or off to control power to the laser diode.

Changes in temperature retrigger the time-on/timeout circuit, so the laser is activated as soon as motion is detected and remains on for a predetermined time detected motion (changes in temperature) ceases.

A parking guide according to the present invention can be used as follows. First, the parking guide is mounted above the desired parking position. Second, the laser output will be aligned such that it will be incident on a designated target location on the vehicle when the vehicle is in the parked position. The alignment of the laser output to the designated target location may be carried out as discussed previously. Third, the vehicle will be moved towards the predetermined parking location and into the field of view, thereby activating the IR sensor and, accordingly, activating the alignment laser. The laser output will be monitored as the vehicle continues to approach the desired parking position. Finally, the vehicle will be parked when the laser output is incident on the designated target location. The laser will be deactivated once motion of the vehicle has ceased and in the time period determined by the timing circuit.

What is claimed is:

1. A parking guide for guiding a vehicle into a desired parking position, comprising:
    a housing including a base adapted for mounting to a structure above the desired parking position;
    a laser source mounted in the housing and producing a laser beam, the laser source including means for adjusting the position of the laser source within the housing so as to adjust a projection of the laser beam so that the laser beam impinges on a selectable location of the vehicle when the vehicle is in the desired parking position;
    a sensor mounted in the housing for detecting the vehicle in a vicinity of the parking position and producing a detection signal representing detection of the vehicle; and
    an electrical circuit responsive to the signal of the sensor for activating the laser source for a predetermined time so that the vehicle can be maneuvered into the desired parking position with the aid of the laser beam;
    wherein the electrical circuit comprises:
        an input transistor having a control electrode and two main electrodes the control electrode being coupled to the detection signal from the sensor;
        a first opamp circuitry having an input terminal coupled to one of the two main electrodes of the input transistor and an output terminal providing a first signal indicative of the detection signal;
        an RC timing circuit coupled to the output terminal of the first opamp circuitry, said RC timing circuit forming a discharge path to discharge a current from the output terminal of the first opamp circuitry so as to decrease the voltage of the first signal as a function of time; and
        a second opamp circuitry having a first input terminal coupled to the output terminal of the first opamp circuitry, a second input terminal coupled to a reference voltage, and an output terminal to generate a switch signal for turning a switch on or off, wherein the switch activates the laser source in response to the detection signal from the sensor.

2. The parking guide of claim 1, wherein the housing is removably attachable to the base.

3. The parking guide of claim 1, wherein the predetermined time is between 45 and 90 seconds.

4. A method of guiding a vehicle into a parking location comprising the steps of:
    using the apparatus of claim 1,
    moving the vehicle towards the desired parking location and into a field of view of the laser beam;
    monitoring the laser beam on the vehicle; and
    parking the vehicle when the laser beam is incident on the selectable location.

5. The parking guide of claim 1, wherein the sensor comprises a motion sensor.

6. The parking guide of claim 1 wherein the first opamp circuitry comprises:
    a first opamp having an inverting input terminal coupled to said one of the two main electrodes of the input transistor, a non-inverting input terminal coupled to a first reference voltage, and an output terminal coupled to the inverting input terminal;
    a second opamp having an inverting input terminal coupled to said output terminal of the first opamp, a non-inverting input terminal coupled to a second reference voltage, and an output terminal coupled to the output terminal of the first opamp circuitry via a first diode; and
    a third opamp having a non-inverting input terminal coupled to said output terminal of the first opamp, an inverting input terminal coupled to a third reference voltage, and an output terminal coupled to the output terminal of the first opamp circuitry via a second diode.

7. The parking guide of claim 6, wherein said RC timing circuit comprises a capacitor and a resistor connected in parallel between the output terminal of the first opamp circuitry and ground.

8. A parking guide for guiding a vehicle into a desired parking position, comprising:
    a housing including a base adapted for mounting to a structure above the desired parking position;
    a laser source mounted in the housing and producing a laser beam on a selectable location of the vehicle when the vehicle is in the desired parking position;
    a sensor mounted in the housing for detecting the vehicle in a vicinity of the parking position and producing a detection signal representing detection of the vehicle; and
    an electrical circuit responsive to the signal of the sensor for activating the laser source for a predetermined time so that the vehicle can be maneuvered into the desired parking position with the aid of the laser beam, the electrical circuit including,
        an input transistor having a control electrode and two main electrodes, the control electrode being coupled to the detection signal from the sensor;
        a first opamp circuitry having an input terminal coupled to one of the two main electrodes of the input transistor and an output terminal providing a first signal indicative of the detection signal;
        an RC timing circuit coupled to the output terminal of the first opamp circuitry, said RC timing circuit forming a discharge path to discharge a current from the output terminal of the first opamp circuitry so as to decrease the voltage of the first signal as a function of time; and a second opamp circuitry having a first input terminal coupled to the output terminal of the first opamp circuitry, a second input terminal coupled to a reference voltage, and an output terminal to generate a switch signal for turning a switch on or off, wherein the switch activates the laser source in response to the detection signal from the sensor.

9. The parking guide of claim 8, wherein the first opamp circuitry comprises:

a first opamp having an inverting input terminal coupled to said one of the two main electrodes of the input transistor, a non-inverting input terminal coupled to a first reference voltage, and an output terminal coupled to the inverting input terminal;

a second opamp having an inverting input terminal coupled to said output terminal of the first opamp, a non-inverting input terminal coupled to a second reference voltage, and an output terminal coupled to the output terminal of the first opamp circuitry via a first diode; and a third opamp having a non-inverting input terminal coupled to said output terminal of the first opamp, an inverting input terminal coupled to a third reference voltage, and an output terminal coupled to the output terminal of the first opamp circuitry via a second diode.

10. The parking guide of claim 9, wherein said RC timing circuit comprises a capacitor and a resistor connected in parallel between the output terminal of the first opamp circuitry and a ground.

* * * * *